INVENTORS:
HAROLD D. COX
J. RONALD DOZIER
DILLARD S. HAMMETT
HOWARD L. SHATTO, JR.
BY: *John K. Wilkens*
THEIR ATTORNEY INVENTORS:
HAROLD D. COX
J. RONALD DOZIER
DILLARD S. HAMMETT
HOWARD L. SHATTO, JR.
BY: *John R. Wilkens*
THEIR ATTORNEY July 18, 1967

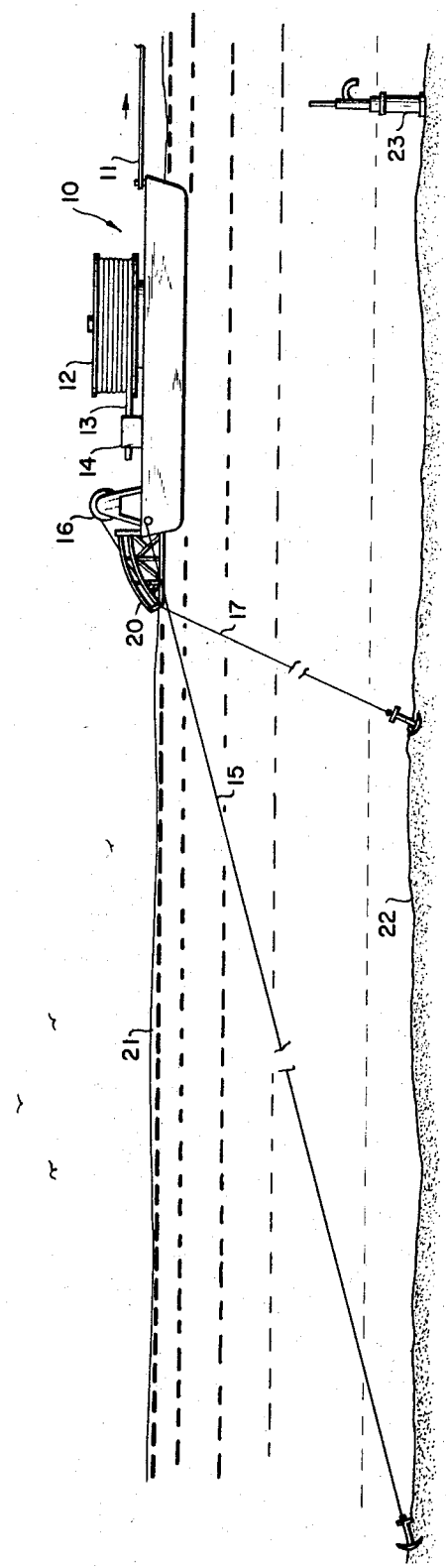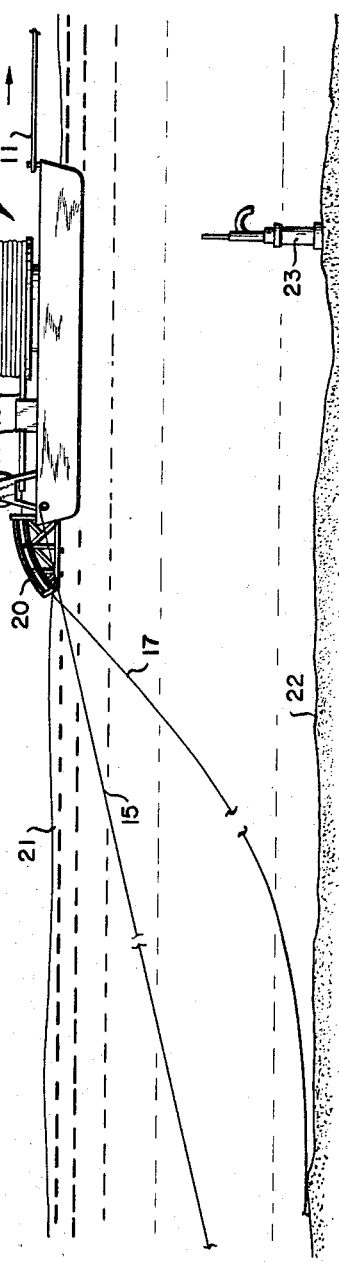
INVENTORS:
HAROLD D. COX
J. RONALD DOZIER
DILLARD S. HAMMETT
HOWARD L. SHATTO, JR.
BY:
THEIR ATTORNEY July 18, 1967  H. D. COX ETAL  3,331,212
TENSION PIPE LAYING METHOD
Filed March 23, 1964  7 Sheets-Sheet 2

H. D. COX ETAL 3,331,212

TENSION PIPE LAYING METHOD

Filed March 23, 1964

INVENTORS:
HAROLD D. COX
J. RONALD DOZIER
DILLARD S. HAMMETT
HOWARD L. SHATTO, JR.

BY:

THEIR ATTORNEY

July 18, 1967
H. D. COX ETAL
3,331,212
TENSION PIPE LAYING METHOD
Filed March 23, 1964
7 Sheets-Sheet 5
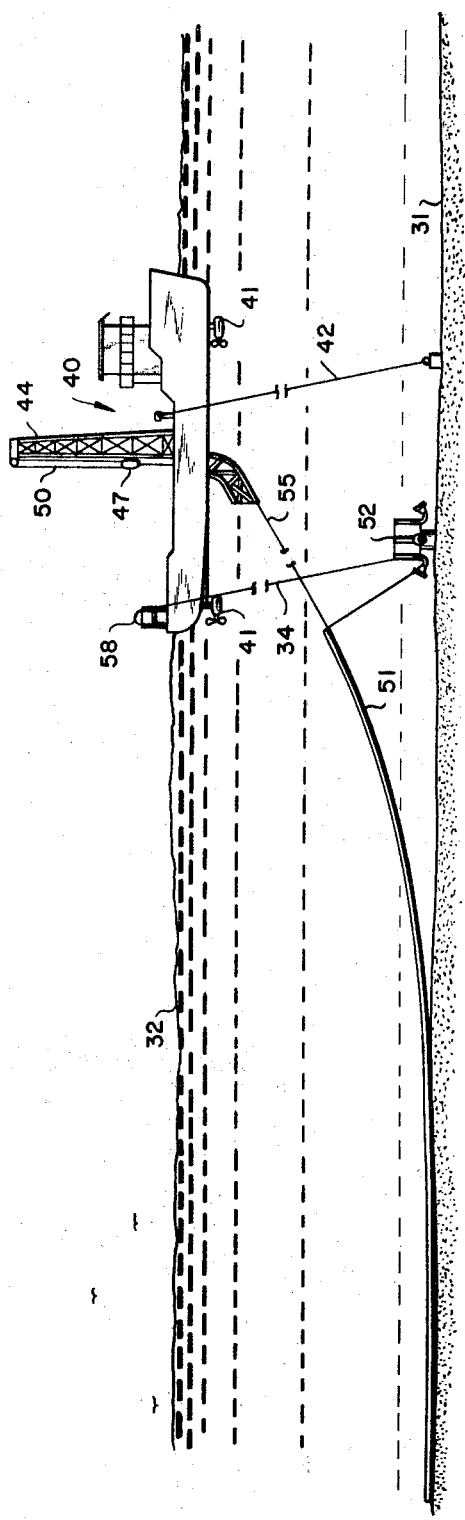
FIG. 9
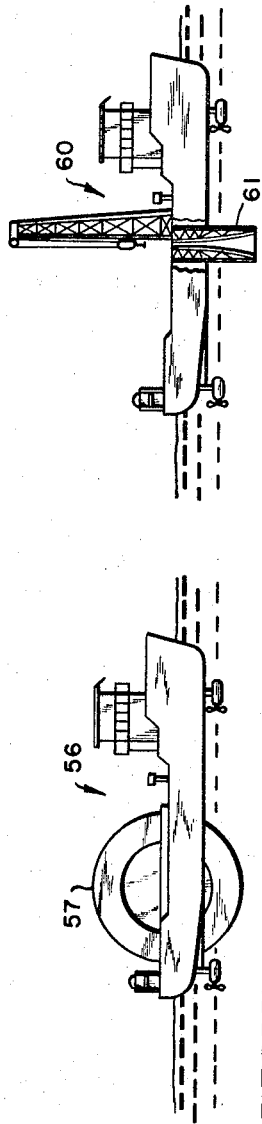
FIG. 12
FIG. 11
INVENTORS:
HAROLD D. COX
J. RONALD DOZIER
DILLARD S. HAMMETT
HOWARD L. SHATTO, JR.
BY: *John R. Ullema*
THEIR ATTORNEY

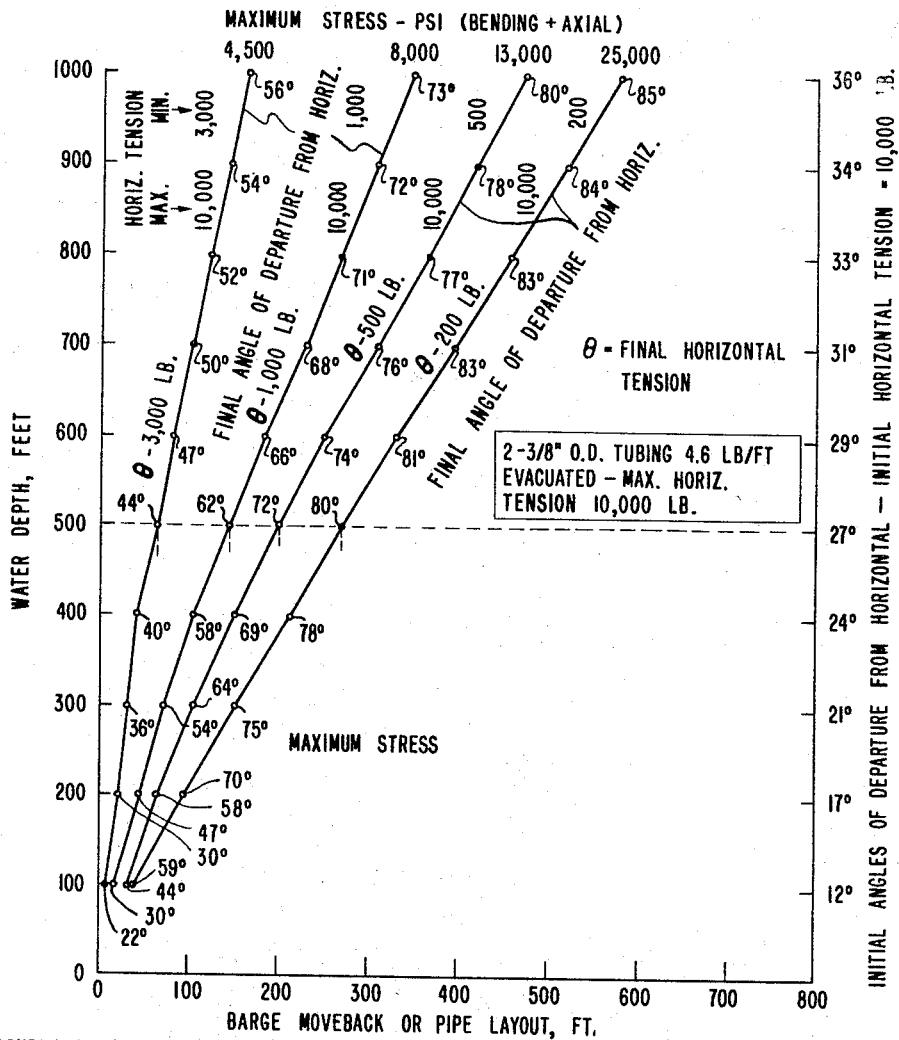

FIG. 13

EXAMPLE CONDITIONS (LAYING AT A DEPTH OF 500 FT. AND INITIAL HORIZONTAL TENSION OF 10,000 LB.)

| MAX STRESS (BENDING + AXIAL) PSI | $\theta$ - FINAL HORIZ. TENSION LB. | INITIAL ANGLE OF DEPARTURE FROM HORIZ. - DEG. | FINAL ANGLE OF DEPARTURE FROM HORIZ. - DEG. | ALLOWABLE MOVEBACK OR PIPE LAYOUT FT. |
|---|---|---|---|---|
| 25,000 | 200 | 27 | 80 | 262 |
| 13,000 | 500 | 27 | 72 | 198 |
| 8,000 | 1,000 | 27 | 62 | 143 |
| 4,500 | 3,000 | 27 | 44 | 60 |

INVENTORS:
HAROLD D. COX
J. RONALD DOZIER
DILLARD S. HAMMETT
HOWARD L. SHATTO, JR.

BY: *John R. Wilkins*

THEIR ATTORNEY

United States Patent Office 3,331,212
Patented July 18, 1967

3,331,212
TENSION PIPE LAYING METHOD
Harold D. Cox, Metairie, La., and Dillard S. Hammett, Hacienda Heights, J. Ronald Dozier, Whittier, and Howard L. Shatto, Jr., Glenville, Calif., assignors to Shell Oil Company, New York, N.Y., a corporation of Delaware
Filed Mar. 23, 1964, Ser. No. 353,979
11 Claims. (Cl. 61—72.3)

This invention relates to the laying of a pipeline along the floor of a deep body of water. More particularly, the invention is directed to the laying of pipeline along such a floor from a floating vessel disposed on the surface of the body of water.

When laying pipeline along the floor of a deep body of water, the problem of avoiding pipeline kinking and excessive bending while staying within the stress limits of the pipeline is ever present and difficult to overcome. This problem results from the fact that very long continuous lengths of pipeline, typically ranging in hundreds of feet, must be lowered from the surface of the body of water to the floor thereof and that controlled movement of such lengths is very difficult. Various systems have been devised to facilitate control of the long lengths of pipeline during the laying thereof in deep bodies of water. Typically, these devices employ extensive guide structures at both the lay-barge end of the pipeline and the floor of the body of water, which guide structures function to support the pipeline and control the movement and bending thereof. As additions or alternatives to these guide structures, buoyant elements are also often used in the prior art to support pipeline being laid.

The aforementioned prior art methods have the shortcoming that they generally necessitate a start and stop laying operation, since relocation of the supporting guide or buoyant means is often required periodically as the pipeline was laid. In the prior art systems interruptions are also encountered under adverse laying conditions resulting from wind or wave action which affect the locating of the extensive guide and buoyancy means. It is noted that the use of extensive guide structures is extremely expensive, since the structures must be fabricated to sustain very high loads. Furthermore, such structures are very susceptible to damage under adverse weather conditions where precise control of lay-barge is impossible.

The foregoing pipe laying systems also often prove ineffective in controlling the direction in which the pipeline is laid and the stresses occurring at the point where the pipeline first touches the floor of the body of water. Direction control is difficult due to the susceptability of the guide or buoyancy means to uncontrolled movement by wind or wave forces. The control of pipeline bending at the first point it touches the floor proves difficult in the prior art systems due to irregularities in the floor of the body of water and inadvertent backup of the barge or boat being used to lay the pipeline.

It is, accordingly, a principal object of this invention to provide a method for laying pipeline along the floor of a deep body of water while avoiding the shortcomings of prior art systems, such as those discussed above. The objects of the invention are achieved through a method wherein pipeline is laid from a floating lay-barge or boat while being held under a tension sufficient to maintain the bending and axial stresses applied thereto within a predetermined range. Through continually controlling the tension on the pipeline being laid, excessive bending and kinking of the pipeline is avoided without the necessity of extensive support structures or buoyant support means. At the same time, accurate control of the direction in which the pipeline is being laid is affected.

In a broad aspect, the method of the present invention may comprise initially extending a first drawline from the lay-barge to the floor of the body of water being worked and then securing one end of the pipeline on the lay barge to a portion of the first drawline disposed on the vessel. With the first drawline and the pipeline so disposed, the vessel is moved in the direction it is desired to lay the pipeline while paying out the end of the pipelines secured to the first drawline. During this time, the paying out of the pipeline and the movement of the vessel is controlled to hold the pipeline under a preselected tension sufficient to maintain the bending and axial stresses applied to the pipeline within a predetermined range. After the length of pipeline desired to be laid has been paid out from the lay-barge, the pipeline is terminated and the terminated end is secured to a second drawline on the lay-barge. With the second drawline so disposed, movement of the lay-barge in the direction in which it is desired to lay the pipeline is continued while paying out the second drawline. The paying out of the second drawline and the movement of the lay-barge is controlled to hold the pipeline under a preselected tension sufficient to maintain the bending and axial stresses applied to the pipeline within a predetermined range. As the second drawline is paid out, the pipeline eventually assumes a position on the floor of the body of water and the basic laying operation is thus completed. As an alternative to moving the lay-barge to pull the pipeline therefrom, the barge may be held stationary and the pipeline may be pulled therefrom by some auxiliary means, such as another barge or a tension means on the floor of the body of water.

In actual practice of the invention, the laying vessel may take substantially any form, such as a non-propelled barge moved by a tug or other auxiliary propulsion means or a self-propelled boat. The tension applied to the pipeline during laying may be controlled through the propulsion of the laying vessel and tension controlling means on the apparatus used to pay out the pipeline. In its more specific applications, the method can be carried out either continuously or at interrupted intervals as dictated largely by the propulsion means for the lay vessel and the pipeline storage and handling means provided thereon. For example, in a preferred embodiment of the invention the pipeline is stored on a reel which provides both for the controlled tension applied to the pipeline and the continuous paying out of the pipeline. The invention may also be extended to provide for the utilization of the first and second drawlines and/or other drawlines as means to draw the pipeline into engagement with selected underwater installations.

The foregoing and other objects of the invention and the specifics thereof will be more fully understood from the following detailed description when taken in conjunction with the accompanying drawings, wherein:

FIGURES 1 to 5 illustrate, in sequence, the steps required in one application of the invention for preparing, laying and terminating the laying of a pipeline on the floor of a body of water from a lay vessel floating thereon;

FIGURES 6 through 10 illustrate the sequence steps involved in another application of the invention wherein a self-propelled lay vessel is utilized to both lay a pipeline on the floor of a body of water and to draw the ends of the pipeline into engagement with installations disposed on the floor;

FIGURE 11 illustrates a lay-vessel suitable for use in the invention illustrated in the FIGURES 6 through 10 sequence drawings and differing from the lay-vessel illustrated in the latter figures only in that the pipeline is paid out as a continuous string from a reeling mechanism rather than a string being assembled in a derrick structure;

FIGURE 12 illustrates a lay-vessel adapted to be used in the embodiment of the invention illustrated in sequence drawings 6 through 10, but differing from the vessel illustrated in the latter figures in that it is provided with a modified guide structure for directing pipeline into the body of water;

FIGURE 13 illustrates exemplary operating curves indicating the operating characteristics encountered in the application of the present invention for a particular pipeline, when the pipeline is limited to certain maximum stresses; and, FIGURE 14 diagrammatically illustrates vessel and pipeline positions illustrative of the characteristics denoted in FIGURE 13.

Figure 3:
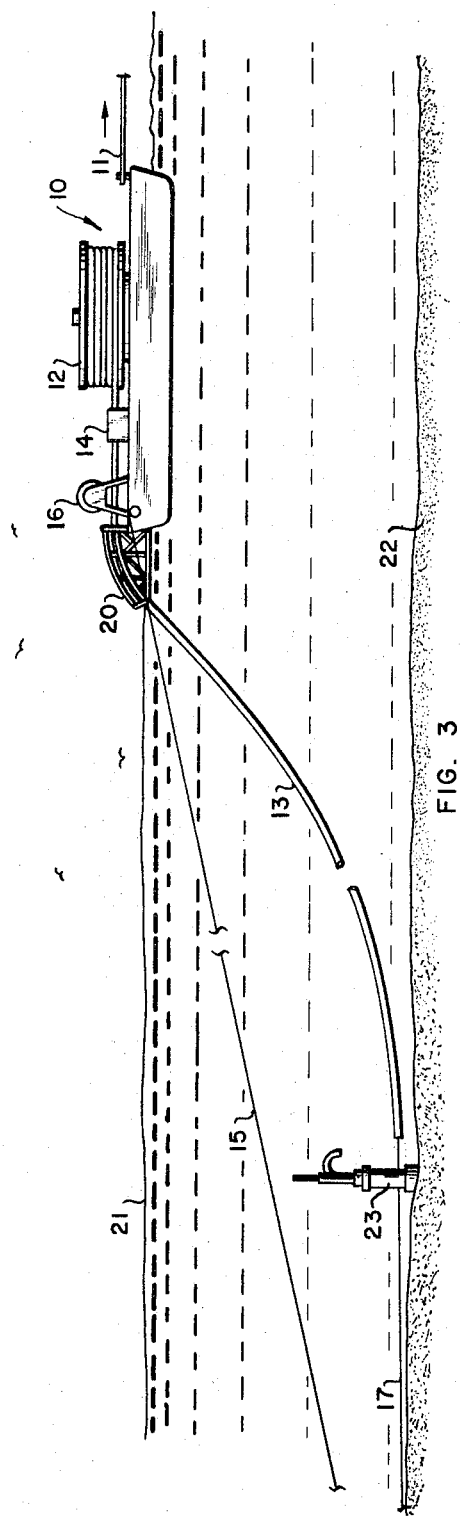

Referring now to FIGURE 1, therein is illustrated a lay-barge 10 of the non-propelled type having a tow line 11 extending to a tug (not illustrated). The lay-barge 10 is provided on the deck thereof with pipe handling apparatus including a reeling mechanism 12 having a continuous pipeline 13 wound therearound, which reeling mechanism is provided with control means to regulate both the rate and the tension at which the pipeline 13 is paid out therefrom. A straightening mechanism 14 is located on the deck of the barge 10 adjacent to the reeling mechanism 12 and provides means whereby the pipeline paid out from the mechanism is straightened prior to the time it is directed off of the lay-barge. The lay-barge 10 also includes a conventional anchor line 15 at the rear thereof provided with suitable actuating means and a winch 16 adapted to pay out a second anchor line 17 for reasons which will become more apparent in the subsequent discussion. The rear of the barge is provided with a supporting structure or "stinger" 20 adapted to control the curvature of the anchor line 17 or pipeline 13 as they are directed off the rear of the barge.

The lay-barge 10 and the elements cooperating therewith are also seen in FIGURES 2 to 5. Accordingly, like numerals in FIGURES 1 to 5 designate corresponding elements. The elements appearing in each of these figures only differ with respect to the positions they assume in the various steps of the sequence depicted by the figures.

In FIGURES 1 to 6, the lay-barge 10 is shown floating on a body of water 21 having a floor 22. On the floor 22 are positioned a wellhead 23 and a gathering facility 24 between which it is desired to lay the pipeline 13. It is noted the wellhead and gathering facility are spaced apart by a distance so large that they cannot both be illustrated in a single figure of a practical scale. Accordingly, the wellhead 23 only appears in FIGURES 1 to 3 and the facility 24 only appears in FIGURES 4 and 5. The appearance of the wellhead and facility in the respective figures results from the fact that the figures depict the barge 10 as it moves from the vicinity of the wellhead 23 to the vicinity of the facility 24.

The wellhead 23 may take substantially any form adapted to have the end of the pipeline 13 secured thereto. For purposes of illustration, the wellhead has been illustrated as corresponding substantially to those illustrated in U.S. Patent 3,233,314 issued on Feb. 8, 1966 by Messrs. B. J. Watkins and G. D. Johnson and entitled "Remotely Connecting Flowlines." Specifically, the wellhead 23 corresponds to that of FIGURE 9 of the U.S. Patent 3,233,314. This wellhead was chosen for purposes of illustration, since it is adapted to have pipelines secured thereto. It is to be understood, however, that the method of the present invention is not limited to use in extending pipelines between any particular types of underwater installations. The facility 24 may also take substantially any form adapted to have the end of a pipeline secured thereto.

Referring now the application of the invention illustrated in FIGURES 1 to 6, the initial stage of operation is shown in FIGURE 1. In this stage, the barge 10 is first positioned to one side of the wellhead 23 to which it is desired to run one end of the pipeline being laid. It is noted that the barge is positioned to the side of the wellhead on the line along which it is desired to lay the pipeline and that the degree to which the barge is initially spaced from the wellhead is determined so that the first lowered end of the pipeline 23 will touch down on the bottom 22 in the close vicinity of the wellhead 23. The exact degree to which the barge is initially spaced from the wellhead 23 is dictated by the depth of the body of water and the physical characteristics of the pipeline being laid.

Upon positioning the barge 10 to one side of the wellhead 23, the anchor line 15 is lowered vertically from the barge so that the anchor thereon securely engages the floor 22. After lowering of the anchor line 15, the barge 10 is moved in the direction it is desired to lay the pipe until the line 15 assumes a position wherein the forces imparted to the barge by the line 15 and the tow line 11 will be assured of holding the barge 10 on course along the line it is desired to lay the pipeline. In a depth of water of about 500 feet, the movement of the barge 10 required to pay out the anchor line 15 to the desired extent might typically be 3500 feet. After the anchor line 15 has been paid out a sufficient length to maintain the barge on course, a second anchor line 17 is lowered from the barge over the stinger 20 and into engagement with the floor 22. With the anchor lines 15 and 17 in secure engagement with the floor 22, as illustrated in FIGURE 1, the barge 10 is moved toward the wellhead 23 along the line it is desired to lay the pipeline. During the latter movement, the anchor lines are paid out and assume a position more closely approaching the horizontal. After the barge 10 has been moved toward the wellhead 23 to a predetermined extent, the anchor line 17 is in condition to be utilized as a drawline to pull the pipeline 13 off the barge and into the body of water 21. Typically, in a depth of water of approximately 500 feet the barge movement between the lowering of the line 17 and the commencement of lowering of the pipeline 13 might be in the order of 2500 feet. As will become apparent subsequently, the exact extent of the latter movement will be dependent on the physical characteristics of the pipeline being laid, the depth of the water and the position of the barge with respect to the wellhead 23. The latter characteristic is particularly important, since the first lowered end of the pipeline 13 should preferably touch down on the floor 22 in the very close vicinity of the wellhead 23.

After the pipeline 13 has been secured to the drawline 17, movement of the barge 10 is continued in the direction it is desired to lay the pipeline and the anchor line 15 and pipeline 13 are continuously and selectively paid out from the barge. The tension held on the anchor line 15 is sufficient to maintain the barge 10 on its course and to prevent barge gaining, and the tension held on the pipeline 13 sufficient to maintain the pipeline in a relatively straight condition wherein the bending and axial stresses applied thereto are maintained within a predetermined range. It is also possible to use an additional means, such as an auxiliary engine, to assist in maintaining the barge on location. The exact amount of tension maintained on the pipeline and the degree to which this tension may be varied without exceeding the maximum stresses is capable of being ascertained, as will be developed subsequently with respect to a specific example of the invention. These stresses are chosen so that the pipeline is not excessively bent, stretched or kinked during the laying operation. The tension applied to the pipeline 13 is controlled by the operation of the reeling mechanism 12. It is noted that reeling mechanisms, such as 12, are ideally suited to control tension, since the tension required to unwind lines wound therearound may be readily controlled, as is well known in the art.

FIGURE 3 illustrates the barge 10 while the first lowered end of the pipeline 13 is being lowered in the vicinity of the wellhead 23 and the barge is moving towards the facility 24. During and subsequent to this time, the tension on the pipeline 13 is maintained to limit bending and axial stresses to which the line is subjected.

Figure 4:
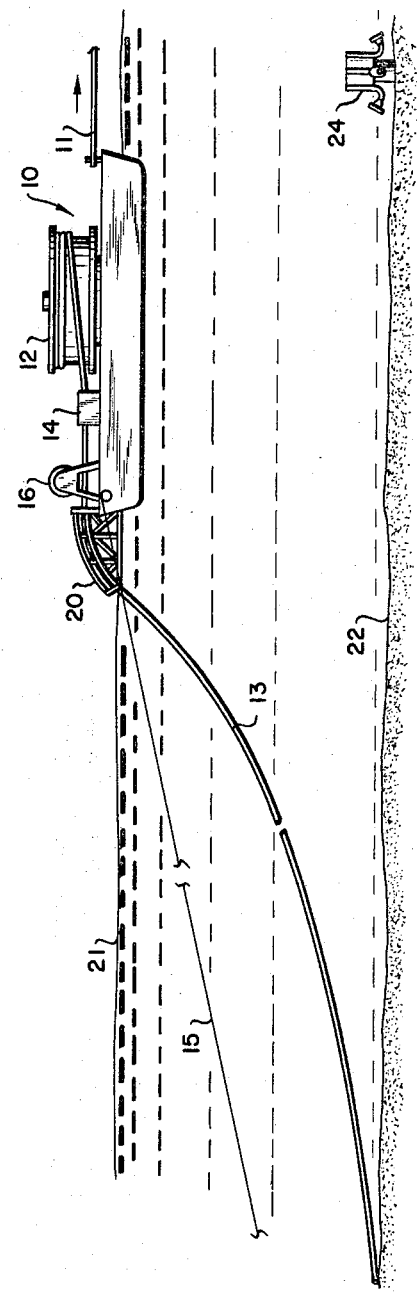
Figure 5:
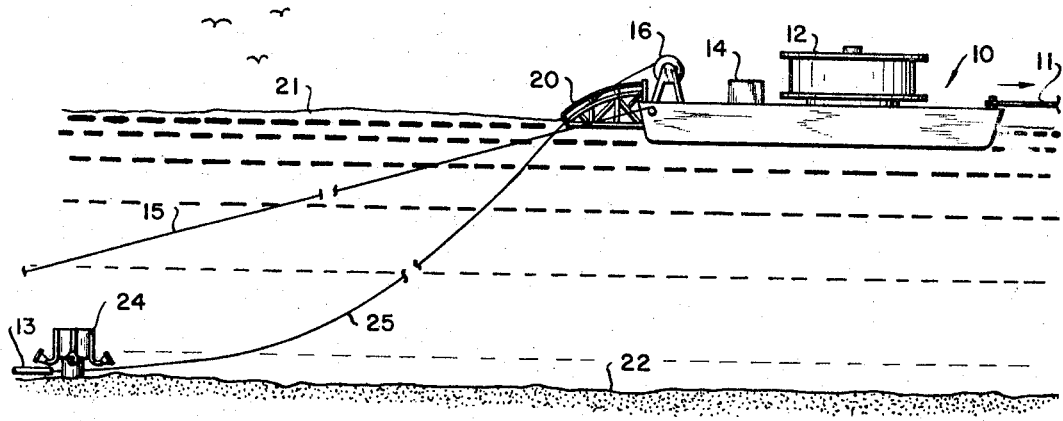

FIGURES 4 and 5 illustrate the barge 10 and pipeline 13 after an amount of pipeline has been paid out sufficient to span the distance between the wellhead 23 and facility 24. When this point is first reached, as illustrated in FIGURE 4, the pipeline 13 is terminated and a second drawline or lowering line 25 is secured to the free end thereof. Once the drawline 25 is secured to the pipeline 13, movement of the barge 10 along the line it is desired to move the pipeline is continued, as illustrated in FIGURE 5 until the end of the pipeline 13 secured to the drawline 25 assumes a position on the floor 22. During movement of the barge 10 from the position shown in FIGURE 4 to that shown in FIGURE 5, both the anchor line 15 and drawline 25 are paid out, with the tension maintained on the line 15 being held sufficient to maintain the barge on course and the tension maintained on the line 25 being held to limit the stresses applied to the pipeline.

After the pipeline 13 has been laid between the wellhead 23 and facility 24, the drawlines 17 and 25 may be removed therefrom and the anchor line 15 may be retrieved, since the laying operation is complete. At this point, supplementary means, such as disclosed in aforementioned U.S. Patent 3,233,314, may be utilized to draw the ends of the pipeline 13 into engagement with the wellhead 23 and facility 24. It is noted that the pipeline 13 should be long enough to facilitate its connection to the wellhead and facility through any desired means, and that such means might be activated either remotely or through the use of divers. Likewise, the removal of the drawlines 17 and 25 may be carried out either remotely or through the use of divers.

Referring now to the sequence drawings of FIGURES 6 to 10, therein is illustrated an alternative arrangement for carrying out the method of the present invention. The arrangement of these figures differs from that described previously with respect to FIGURES 1 to 5 primarily in that it includes provisions to facilitate the engagement of the pipeline being laid with the installations between which it is extended. In addition to this principal difference, the lay-barge and its associated apparatus illustrated in the sequence of FIGURES 6 to 10 is illustrated as differing from that shown in FIGURES 1 to 5. The latter difference is intended merely to show that the method of the present invention can be practiced with varying apparatuses. Specifically, the method as shown in FIGURES 6 to 10 is practiced with a self-propelled barge provided with dynamic positioning means and with a conventional pipeline lowering derrick rather than a reel.

Figure 6:
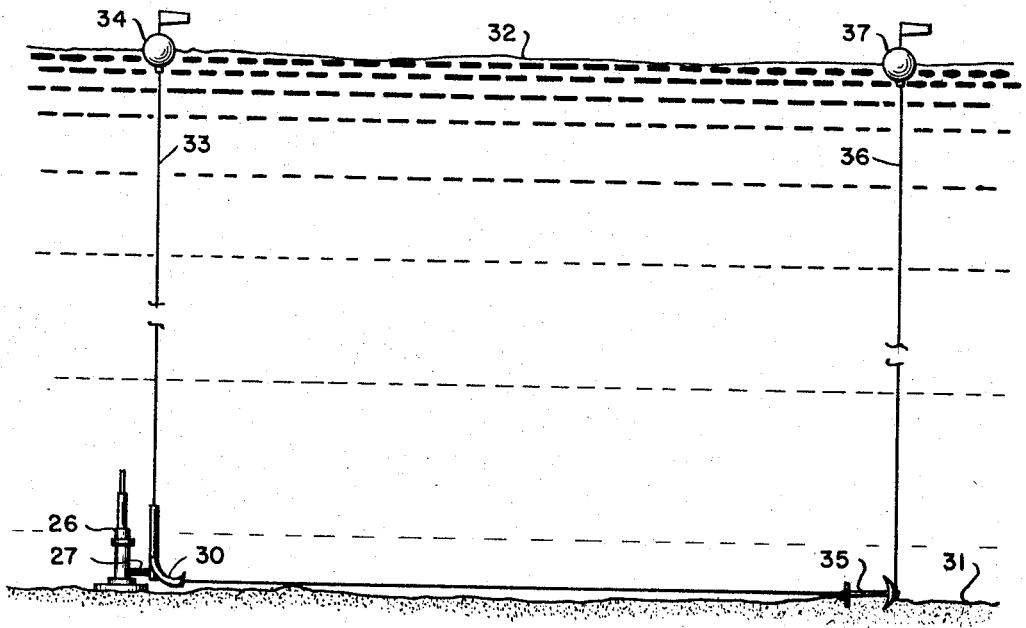

Referring now specifically to FIGURE 6, therein is illustrated a wellhead 26 provided with outrigger arm 27 carrying a pipeline receiving alignments tube 30. The particular structure of the alignment tube 30 is found in U.S. Patent 3,298,092 issued on Jan. 17, 1967 by James Ronald Dozier and Glenn D. Johnson entitled Connection of Underwater Flowlines. The wellhead 26 is positioned on the floor 31 of a body of water 32. As illustrated, the alignment tube 30 has extending therethrough a drawline 33 having one end supported by marker buoy 34 and the other end secured to an anchor 35 disposed on the floor 31. The anchor 35 is, in turn, secured to a crown line 36 supported by marker buoy 37. It is noted that for all practical purposes the lines 33 and 36 can be considered one continuous line, since they are both fixedly secured to the anchor 35.

Figure 7:
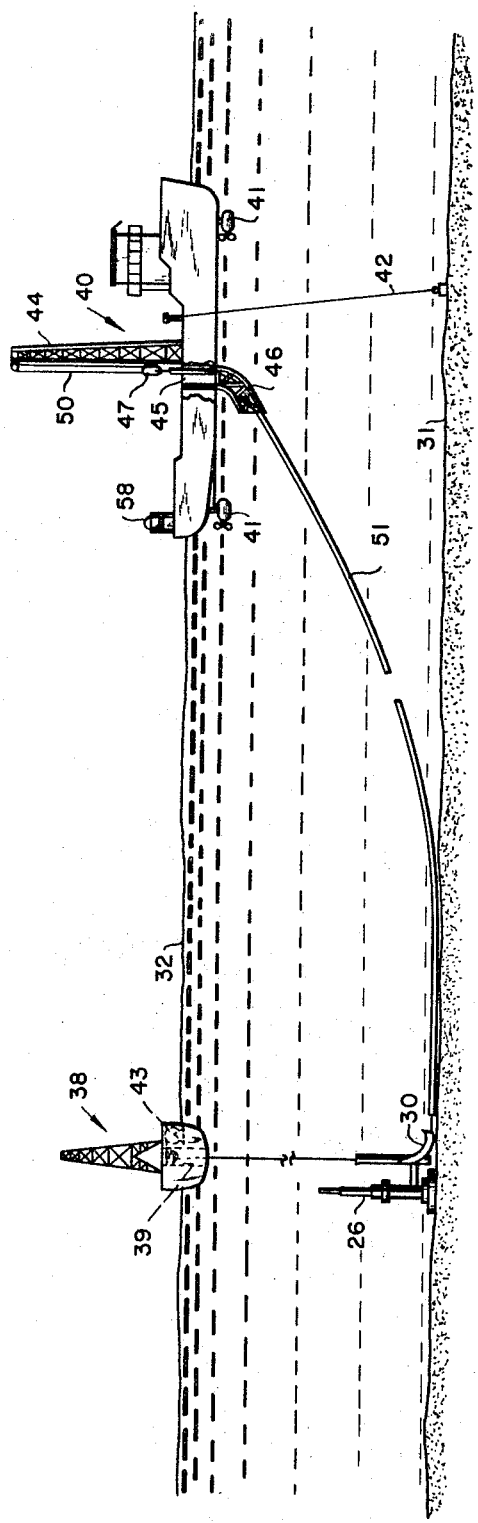

FIGURE 7 illustrates the wellhead structure described with reference to FIGURE 6 as it is being used to facilitate the pipeline laying method of the present invention. It is noted that corresponding pieces of apparatus are illustrated in the sequence drawings of FIGURES 6 to 10 and, accordingly, like numerals are used to designate these corresponding apparatuses. In FIGURE 7, a self-propelled lay-barge 40 is shown positioned above and to one side of the wellhead 26 in the initial stage of the laying operation. The barge 40 includes propulsion props 41 to control the movement of the barge and a tilt-meter line 42 adapted to be extended to the floor of a body of water at a point above which it is desired to position the barge. The tilt-meter line cooperates with a control mechanism on the barge to activate the props 41 and maintain the barge dynamically over the preselected position. The control mechanism (not illustrated) and the manner in which it cooperates with the tilt-meter line 42 and the propulsion props 41 to position the barge is clearly disclosed in U.S. Patent 3,187,704, issued on June 8, 1965 by Messrs. H. L. Shatto, Jr., and J. R. Dozier, and entitled "Ship Control System."

The structure on the barge 40 further includes a derrick 44 disposed above a well 45 extending through the center of the barge into communication with the body of water therebelow. Within the well 45 and directly therebelow is disposed a guide or "stinger" 46 adapted to guide and limit the bending radius of lines extending therethrough. It is noted that the derrick 44 is located so as to be adapted to lower pipelines through the well 45. These lines would typically be assembled from sections as they are fed through the well. Thus a continuous line is formed with one end thereof supported by the derrick through means, such as a travelling block 47. The travelling block 47 is supported through cables 50 which are adapted to raise and lower the block and to some extent control the amount of tension imparted to a pipeline secured thereto.

FIGURE 7 also illustrates a draw-barge 38 of similar construction to the barge 40 and having provided thereon a winch 43 adapted to be secured to lines extending through the well 39 in the barge. The operation of the draw-barge 38 in conjunction with the barge 40 will become apparent from the subsequent discussion.

In operation of the application of the invention illustrated in FIGURE 7, the lay-barge 40 is first positioned over the location where it is desired to commence laying through means of previously described tilt-meter line 42 and its cooperating positioning mechanism. At about the same time, the draw-barge 38 is positioned above the wellhead 26 through any suitable means. The end of the drawline 33 secured to the marker buoy 34 is then engaged on the winch 43 of the barge 38 and the other end of the drawline is pulled up and through the well 45 of the barge 40. The latter operation is accomplished by pulling the crown line 36 and anchor 35, along with the drawline 33 secured thereto, to the barge 40. After the drawline 33 is pulled through the well 45, a pipeline 51, having one end supported by the travelling block 47, is secured to the end of the drawline previously secured to the anchor 35.

With the pipeline 51 secured to the drawline 33, laying of the pipeline is commenced by applying tension to the drawline through the winch 43. This tension functions to draw the pipeline toward the wellhead 26 as illustrated in FIGURE 7. It is noted that during drawing of the pipeline 51 through the well 45, sections of pipe are continuously added thereto at the derrick 44. The stinger 46 imits the bend radius assumed by the pipeline as it departs from the barge 40 and the tension applied to the drawline through the winch 43 is controlled so as to maintain the bending and axial stresses applied to the pipeline within a predetermined range. This range is chosen so that the pipeline is not excessively bent, kinked or stretched during the laying operation. It is noted that in the initial condition illustrated in FIGURE 7, the barge 40 is located relative to the wellhead 26 so that the pipeline 51 may be pulled into a position closely adjacent the wellhead without requiring movement of the barge 40. The exact positioning of the barge can be readily determined by knowing the depth of water and the angle at which the pipeline departs from the barge.

After the pipeline 51 has been pulled closely adjacent to the wellhead 26, as illustrated in FIGURE 7, the barge 40 is moved in the direction it is desired to lay the pipeline, while paying out the pipeline, until at least a portion of the pipeline assumes a position tangent to the floor 31. During this initial movement of the barge 40, the tension maintained on the pipeline is controlled to limit the stresses applied to the pipeline. After the pipeline assumes a position tangent to the floor 31, tension is applied thereto through the drawline 33 to draw the end thereof secured to the drawline into engagement with the alignment tube 30. A detailed description of the manner in which the alignment tube 31 engages a pipeline drawn thereinto is found in aforementioned U.S. Patent 3,298,092. Naturally, as the pipeline 51 is being drawn into the alignment tube 30 the tension applied thereto at the barge end is maintained to control the stresses applied to the pipeline.

Figure 8:
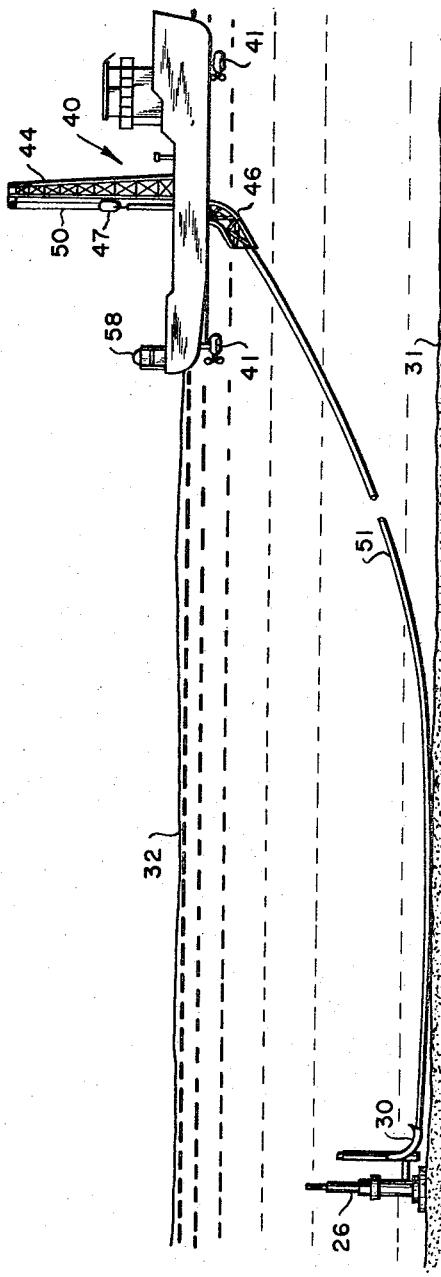

After the pipeline 51 has been drawn into engagement with the alignment tube 30, the first drawline 33 and the tilt-meter line 42 are disconnected from the pipeline 51 and floor 31, respectively, and retrieved. At this point continued laying of the pipeline 51 may be carried out in a manner substantially as described with respect to the pipeline 13 in the FIGURES 1 to 5 sequence. Specifically, continued laying of the pipeline 51 is accomplished by moving the barge 40 in the direction it is desired to lay the pipeline while paying out the pipeline, as illustrated in FIGURE 8. During movement of the barge 40, programmed horizontal tension in the pipeline is maintained by exerting a constant thrust on the main propulsion screws of the barge. The effects of currents, waves, and winds on the horizontal tension exerted by the barge are checked by periodic measurements of the pipe shape, and corrections in propulsion efforts are made as required. Alternatively, the propulsion units are controlled to provide a constant horizontal thrust on the pipeline as measured by strain gauges of the maintaining members of stinger 46. The thrust can also be controlled in response to measurements of the angle of departure of the pipeline from the vessel, as will become apparent from the subsequent example.

Figure 10:
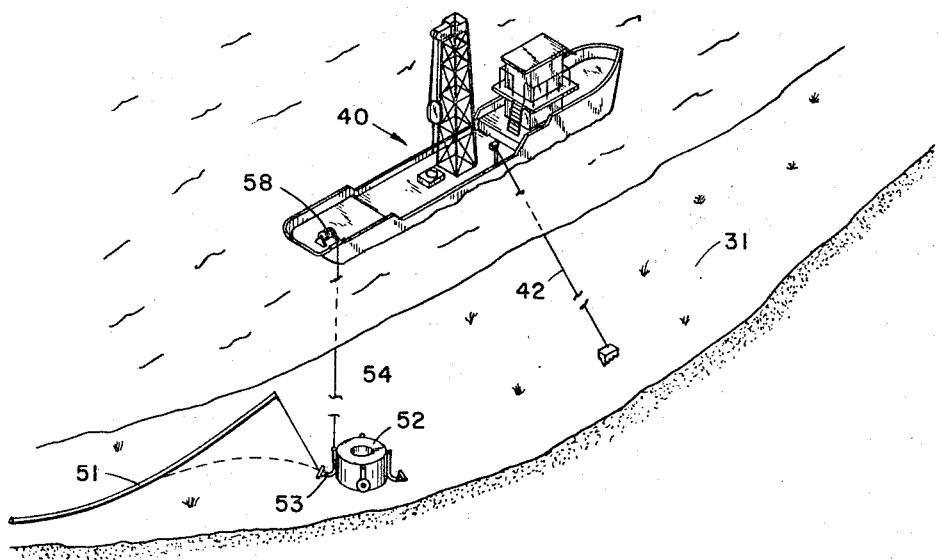

Referring now to FIGURE 9, therein is illustrated an underwater installation 52, such as a storage facility, located on the floor 31 of the body of water 32. The installation 52 is shown as being provided with a plurality of alignment tubes 53, corresponding to the previously described tubes 30. In the condition illustrated in FIGURE 10, the barge 40 is shown in position to lower the second end of the pipeline 51 into engagement with one of the alignment tubes 53 on the installation 52. Although FIGURE 10 illustrates the pipeline 51 as already being drawn toward the alignment tube 53, it is to be understood that initially the alignment tube had extending therethrough a drawline 54 with its ends secured to buoys corresponding substantially to the buoys 34 and 37 illustrated in FIGURE 6. In the latter state, the drawline 54 was facilitated for use in a manner substantially corresponding to that previously described with respect to the drawline 33.

In operation, when the barge 40 approaches the installation 52 to which it is desired to connect the pipeline 51, the pipeline is terminated at a length which perimts the terminated end thereof to be lowered to the installation 52. Actually, as will be developed subsequently with respect to FIGURE 10, the pipeline is lowered to one side of the installation and subsequently drawn into engagement therewith. After being terminated at the desired length, the terminated end of the pipeline is secured to one end of the drawline 54 and to the end of a lowering line 55 extending through the well 45 in the barge. The lowering line 55 is secured to suitable tension means, such as a winch (not illustrated) on the barge 40. Before, or after, the one end of the drawline 54 is secured to the pipeline 51, the other end of the drawline is operatively secured to a winch 58 on the barge 40. With the pipeline 51, drawline 54 and lowering line 55 so disposed, the barge 40 is located above the installation 52 in a position wherein the pipeline 51 may be lowered closely adjacent and to one side of the installation 52. The barge is maintained in the latter position by lowering the tilt-meter line 42 into engagement with the floor 31 and operating the positioning mechanism cooperating therewith. At this point the pipeline 51 is lowered to the floor 31 by paying out the lowering line 55 and reeling in the drawline 54. During the lowering of the pipeline, the drawline 54 is maintained in a substantially slack condition so as not to affect the positioning of the pipeline, whereas the lowering line 55 is maintained under sufficient tension to control the stresses applied to the pipeline.

Referring now to FIGURE 10, therein is illustrated the barge 40 and installation 52 after the pipeline 51 has been lowered to the floor 31 and the lowering line 55 has been disconnected therefrom. In this condition, the pipeline 51 may be drawn into engagement with the alignment tube 53 by simply applying tension to the drawline 54. This tension functions to move the pipeline 51 from the solid line position illustrated into the dotted line position. It is noted that at least a portion of the alignment tube 53 is preferably pivotally mounted in order to facilitate its alignment with the end of the pipeline 52. After engagement of the pipeline 51 with the tube 53, the drawline 54 may be removed therefrom by remotely operable means or through means of a diver.

At this point it is noted that the purpose of initially laying the pipeline 51 to one side of the installation 52 was to facilitate engagement of the pipeline in the alignment tube 53. This procedure is necessary because, as a practical matter, it is very difficult, if not impossible, to cut the pipeline to a length where it may be drawn directly to the installation. The difficulty in cutting the pipeline to exact length is avoided by drawing the line to one side of the installation, since the line may then be pulled to the installation in a gently sweeping curve, as illustrated by the dashed line in FIGURE 7. The initial pulling the pipeline to one side of the installation also provides for a degree of slack which facilitates the drawing of the pipeline into the alignment tube 53. The manner in which the pipeline is drawn into the alignment tube is developed in aforementioned U.S. Patent 3,298,092.

FIGURE 11 illustrates a self-propelled barge 56 adapted to be used in the application of the invention illustrated in FIGURES 6 to 10. The barge 56 differs from the aforedescribed barge 40 in that the pipeline handling apparatus comprises a reeling mechanism 57 rather than a derrick 44 and that it does not include a pipeline "stinger." The use of such a reeling mechanism has the advantage that the pipeline may be stored on a continuous spool, thus alleviating the necessity of joining sections of pipe as the pipeline is paid out. The reeling mechanism 57 also has the advantage that tension applied to the pipe may be readily controlled therethrough, as is well known in the art. It is noted that the reel of the mechanism 57 functions to limit the bending stresses applied to the pipeline as it departs from the barge and that, therefore, no stinger is necessary. Although not illustrated, the reeling mechanism is preferably used in combination with a pipeline straightening mechanism corresponding substantially to the mechanism 14 used with aforedescribed barge 10.

FIGURE 12 illustrates yet another form of a self-propelled barge 60 corresponding substantially to the barge 40 described with reference to FIGURES 6 through 11. The barge 60 differs from the barge 40 only in that the guide or "stinger" structure 61 directs pipeline passing therethrough into the body of water in a direction close to the vertical rather than the horizontal. The purpose of this difference is to facilitate situations wherein it is more desirable to lower pipeline in a substantally vertical direction. The direction in which the pipeline is lowered is dictated by such things as the size of the pipe, the depth of the water and the allowable bending and axial stresses that may be applied to the pipe. Furthermore, situations may occur where, for economical purposes, it is desirable to lower the pipeline in a substantially vertical direction to minimize the tension required to be applied thereto to limit axial and bending stresses applied to the pipeline.

To reiterate for the sake of clarity, it is noted that the barges illustrated in the sequence of FIGURES 1 to 5, the sequence of FIGURES 6 to 10, and in FIGURES 12 and 13 may all be used in the application of the invention. The particular barge chosen for an application of the invention will be dictated primarily by availability and economy. For example, situations may occur where it is desirable to use a barge of the type illustrated in the sequence of FIGURES 1 to 5 in the sequence of FIGURES 6 to 10. Whether a barge with a substantially horizontally extending stinger or a substantially vertical extending stinger is used will be dictated by the previously discussed factors of: pipeline characteristics; depth of water; and allowable bending and axial stresses.

*Example*

Referring now to FIGURE 13, therein is illustrated a set of curves showing the characteristics that a particular pipeline limited to specific stresses may assume when being laid at a known depth. As indicated in the box in FIGURE 13, the curves are applicable to an evacuated tubing having an outside diameter of 2⅜" and a weight of 4.6 pounds per foot. The optimum horizontal tension for laying this pipeline to maintain the axial and bending stresses applied thereto to the preferred degree was determined as being 10,000 pounds. Thus, as shown on the right hand ordinate of the curve, the initial horizontal tension when laying the pipeline is 10,000 pounds. The right hand ordinate also designates the initial angle from the horizontal at which the pipeline departs from the lay-barge or stinger thereon in various depths of water. The particular depths of water are found on the left hand ordinate of the curves. The lower abscissa of the curves designates the amount of barge moveback or pipe layout in feet that is permissible without exceeding the allowable bending and axial stresses for the pipeline.

Each of the curves in FIGURE 13 is for the same tubing, but differs from the others in the allowable stresses chosen therefore. Specifically, as indicated at the top of FIGURE 13, curves A, B, C and D have chosen maximum stresses (bending plus axial) of 4,500; 8,000; 13,000 and 25,000 p.s.i., respectively. The optimum horizontal tension for each of these chosen stresses is 10,000 pounds and the minimum horizontal tension, as indicated at the top of FIGURE 13 is 3,000; 1,000; 500 and 200 pounds for curves A, B, C, and D, respectively. The angle from the horizontal at which each of the pipelines represented on the curves depart from the lay-vessel at minimum tension is illustrated along the side of each of the curves for various depths.

An illustrative example applying the curves of FIGURE 13 is indicated by the dashed lines thereon and the values determined through use of the curves with the example are shown at the lower portion of the figure. From the example conditions it can be seen that the depth of water is 500 feet and that the balance of the values for each of the maximum stresses indicated by the curves can be read directly. Specifically, it can be seen that at each maximum stress the initial horizontal tension and the initial angle of departure correspond, whereas the final horizontal tension, the final angle of departure, and the allowable moveback or pipe layout vary.

Figure 14:
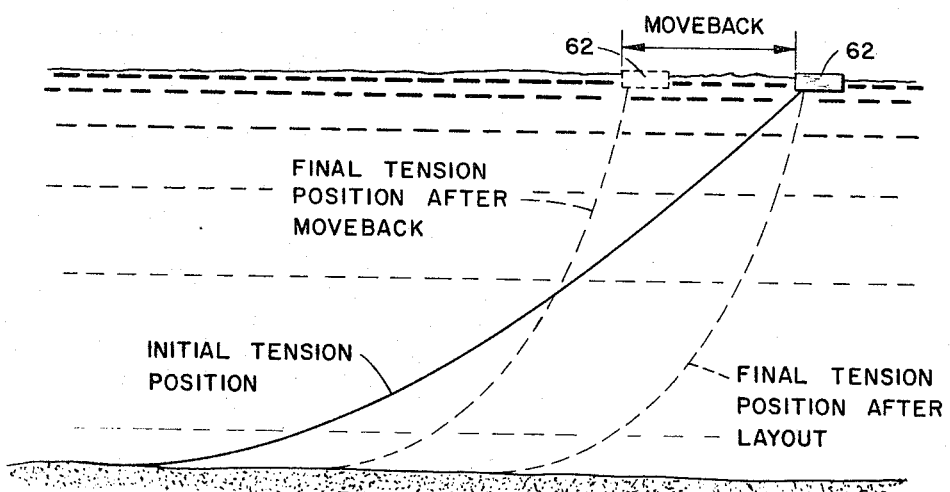

FIGURE 14 diagrammatically illustrates the pipeline and barge positions that would be assumed in an application of the invention. In particular, the figure more clearly shows the conditions represented by the curves of FIGURE 13. In FIGURE 14, a lay-barge 62 is illustrated in solid line in the condition of initial or optimum tension with a pipeline 63 under the optimum tension also being shown in solid line. It is noted that this optimum tension is the initial tension applied to the pipeline as is clear from the FIGURE 13 curves. The dashed line extending down from the solid line representation of the barge 62 indicates the final tension position of the pipeline 63 after the maximum permissible layout without barge moveback, as indicated along the lower abscissa of FIGURE 13. The dashed line representation of the barge 62 and the dashed line extending downwardly therefrom indicate the barge and pipeline position, respectively, after permissible moveback without pipe layout, as designated along the lower abscissa of FIGURE 13 and corresponding in dimension to permissible pipe layout.

The tension (i.e., axial tension) applied to the pipeline may be measured and controlled in several alternative ways. The most obvious way is simply to measure the axial tension directly on the barge and to control this tension through any suitable means, such as the aforedescribed reeling mechanism. As an alternative, for any particular angle of pipeline departure from the barge, either the horizontal or vertical component of the tension may be measured on the barge and this component may be related to the axial tension and utilized to control the tension imparted to the pipeline on the barge. In the latter case, control is effected simply by controlling either the horizontal thrust or vertical force applied to the pipeline at the barge. Horizontal thrust may be controlled through the propulsion screws of the barge and vertical force can be controlled through the pipeline handling means, such as the aforedescribed derricks and associated structure. As yet another alternative, once pipeline characteristic curves, such as those developed in the foregoing example, have been developed control of tension can be effected by controlling the angle at which the pipeline departs from the lay-barge.

From the foregoing discussion, and particularly the examples of FIGURES 13 and 14, it is believed apparent that the method of the present invention can be practiced with some flexibility. Specifically, in a continuous laying process, such as that described with reference to the sequence drawings of FIGURES 1 to 5 and FIGURES 6 to 10, respectively, a certain amount of barge moveback is permissible without stressing the pipeline beyond the maximum selected limit. This flexibility is necessary, since wind and wave action, other possible interruptions, and barge movement may make some barge moveback unavoidable. The example also illustrates the flexibility of the invention with respect to the possibility of discontinuous pipe laying. Discontinuous in this sense is meant to apply to pipe laying wherein barge movement is interrupted intentionally during laying of the pipeline, as contrasted to continuous barge movement laying procedures.

In the discontinuous laying procedure of this invention, the barge is first moved to a position imposing an initial tension on the pipeline chosen as the optimum tension. At this point, the pipeline is paid out from the barge until the tension equals the minimum allowable tension. Both the amount of pipe layout and the minimum tension are readily determined from operating curves, such as those illustrated in FIGURE 13. After the pipeline has been paid out to the permissible extent, the barge is once again moved to a position wherein the tension on the pipeline is optimum. At this point the pipeline is again paid out to the maximum layout condition. Thus, it can be seen that the pipeline laying method of the present invention can be practiced by intermittent barge movement and pipeline layout.

The operating curves for the method of the present invention, as exemplified by FIGURE 13, can be determined either mathematically or experimentally. For example, the method used to predict stresses may use the beam theory equation which considers the rigidity of the pipe to beyond the point of maximum bending stress where the amount is about equal to zero. At the latter point, rigidity no longer significantly contributes to the shape of the pipeline. From this point to the lay-barge the pipeline assumes a catenary shape, and catenary equations are used for predicting the shape of the upper portion of the line. By combining these two theories an approximate solution can be developed to predict the entire shape of the line. To check the results obtained from the mathematical derivation, tests may be conducted using both laboratory and full scale environments.

To conclude, it is noted that the present invention is not intended to be limited to the specific applications illustrated and described. For example, the lay-vessels used in the various applications may be substituted, one for the other, and the particular means to facilitate engagement of the ends of the pipeline being laid with an underwater installation may be varied. Therefore, various changes in the details of the described method may be made, within the scope of the appended claims, without departing from the spirit of the invention.

We claim as our invention:

1. A method of laying a pipeline on the floor of a body of water from a vessel floating on said body, said method comprising:
    (a) anchoring one end of the pipeline to the floor of the body of water;
    (b) moving the vessel in the direction it is desired to lay the pipeline and paying out the end of the pipeline anchored to the floor of said body of water;
    (c) controlling the paying out of the pipeline and movement of the vessel to hold the pipeline under preselected tension sufficient to maintain the bending and axial stresses applied thereto within a predetermined range;
    (d) terminating the pipeline on the vessel at the length thereof desired to be laid, thus forming another end;
    (e) securing a drawline between said other end of the pipeline and the vessel; and,
    (f) paying out the drawline to lower said other end of the pipeline to the floor of the body of water, the paying out of the drawline being controlled to hold the pipeline under preselected tenison sufficient to maintain the bending and axial stresses applied thereto within a predetermined range.

2. A method according to claim 1 wherein the movement of the vessel in the direction it is desired to lay the pipeline is continuous and the paying out of pipeline during said movement is continuous.

3. A method according to claim 1 wherein the vessel is moved in increments without paying out pipeline to pull the pipeline to an initial tension wherein the bending and axial stresses applied thereto are at the lower end of said predetermined range and wherein the pipeline is paid out at the end of each of said increments to lower the tension held thereon until the bending and axial stresses applied thereto are at the uppermost end of said predetermined range.

4. A method according to claim 1 wherein the tension applied to the pipeline at a particular angle of departure from the vessel is maintained by controlling the thrust with which the vessel is propelled.

5. A method according to claim 1 wherein the tension applied to the pipeline at a particular angle of departure from the vessel is maintained by controlling the vertical force applied to the pipeline as it departs from the vessel.

6. A method according to claim 1 wherein the tension applied to the pipeline is maintained by controlling the angle at which the pipeline departs from the vessel.

7. A method according to claim 1 wherein the pipeline is initially paid out from the vessel in substantially a vertical direction.

8. A method according to claim 1 wherein the pipeline is initially paid out from the vessel in substantially a horizontal direction.

9. A method according to claim 1 wherein the pipeline is paid out from the vessel while freely movable at the vessel with respect to the angle of departure between the pipeline and vessel.

10. A method of extending a pipeline into communication with an installation submerged in a body of water and laying the pipeline on the floor of said body from a floating vessel, said method comprising:
    (a) extending the intermediate portion of a drawline into sliding engagement with the submerged installation;
    (b) extending the ends of said drawline to the surface of said body of water;
    (c) securing one end of a pipeline to be laid to one end of the drawline;
    (d) paying in the other end of the drawline with a preselected amount of tension while paying out the pipeline secured to said one end of the drawline, said preselected amount of tension being sufficient to maintain the bending and axial stresses applied to the pipeline within a predetermined range;
    (e) continuing to pay in said other end of the drawline while paying out the pipeline secured to said one end of the drawline until the pipeline is drawn into communication with the installation; and,
    (f) moving the vessel in the direction it is desired to lay the pipeline and paying out the pipeline while holding a preselected amount of tension thereon sufficient to maintain the bending and axial stresses applied to the pipeline with a predetermined range.

11. A method of laying a pipeline along the floor of a body of water between two installations disposed thereon from a vessel floating on said body, said method comprising:
    (a) extending the intermediate portion of a first drawline into sliding engagement with one of the installations;
    (b) extending the ends of said first drawline to the surface of said body of water;
    (c) securing one end of the pipeline to be laid to one end of said first drawline;
    (d) paying in the other end of said first drawline with a preselected amount of tension while paying out the pipeline secured to said one end of the drawline, said preselected amount of tension being sufficient to maintain the bending and axial stresses applied to the pipeline within a predetermined range;
    (e) continuing to pay in said other end of said first drawline while paying out the pipeline secured to one end of said first drawline until the pipeline is drawn into communication with said one installation;
    (f) moving the vessel toward the other installation and paying out the pipeline while holding a preselected amount of tension thereon sufficient to maintain the bending and axial stresses applied to the pipeline within a predetermined range;
    (g) terminating the pipeline at the other end thereof at a length determined to be sufficient to adapt said other end to be drawn into engagement with the other installation;

(h) extending the intermediate portion of a second drawline into sliding engagement with said other installation;
(i) extending the ends of said second drawline to the surface of said body of water;
(j) securing said other end of the pipeline to one end of said second drawline;
(k) extending a lowering line between the vessel and said other end of the pipeline;
(l) paying out the lowering line to lower said other end of the pipeline to the floor of the body of water, said lowering line being held under sufficient tension to maintain the bending and axial stresses applied to the pipeline within a predetermined range; and,
(m) paying in the other end of the second drawline to draw said other end of the pipeline into communication with said other installation.

References Cited

UNITED STATES PATENTS

| 3,258,928 | 7/1966 | Broadway et al. | 61—72.3 |
| 3,262,275 | 7/1966 | Perret | 61—72.3 |
| 3,266,256 | 8/1966 | Postlewaite et al. | 61—72.3 |

FOREIGN PATENTS

| 601,103 | 1948 | Great Britain. |
| 947,196 | 1964 | Great Britain. |

DAVID J. WILLIAMOWSKY, *Primary Examiner.*

JACOB SHAPIRO, *Examiner.*